No. 874,856.　　　　　　　　　　　　PATENTED DEC. 24, 1907.
W. MASON.
TUBULAR MAGAZINE AUTOMATIC GUN.
APPLICATION FILED FEB. 18, 1907.
12 SHEETS—SHEET 5.
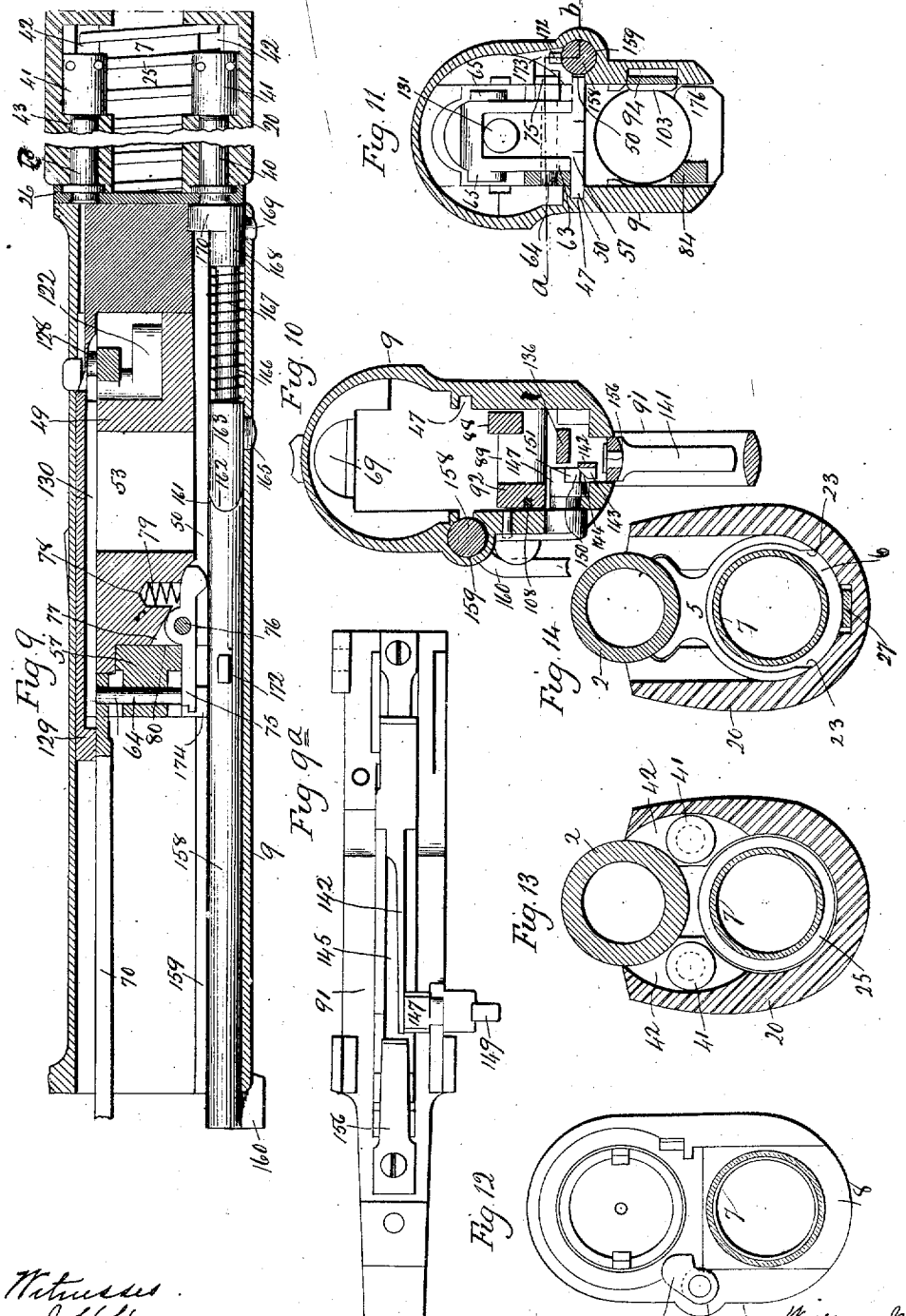

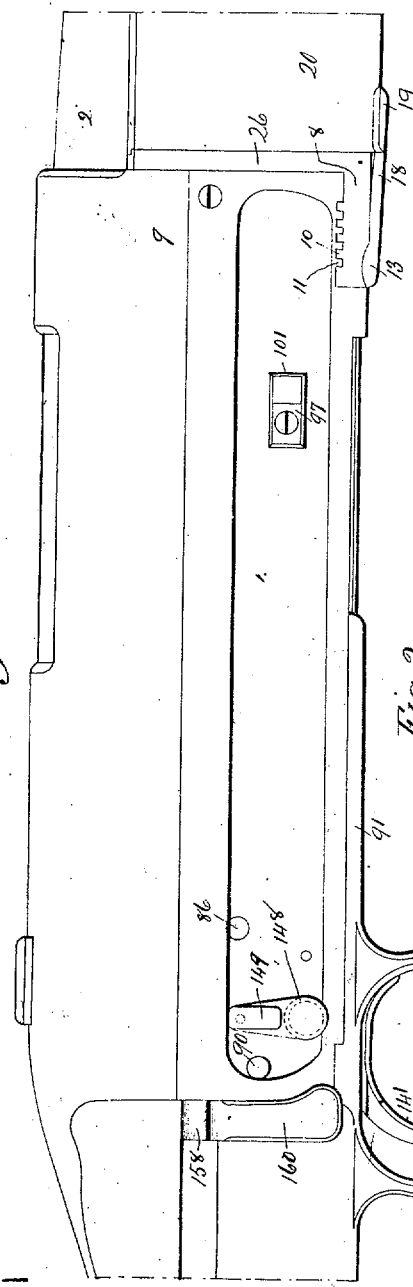

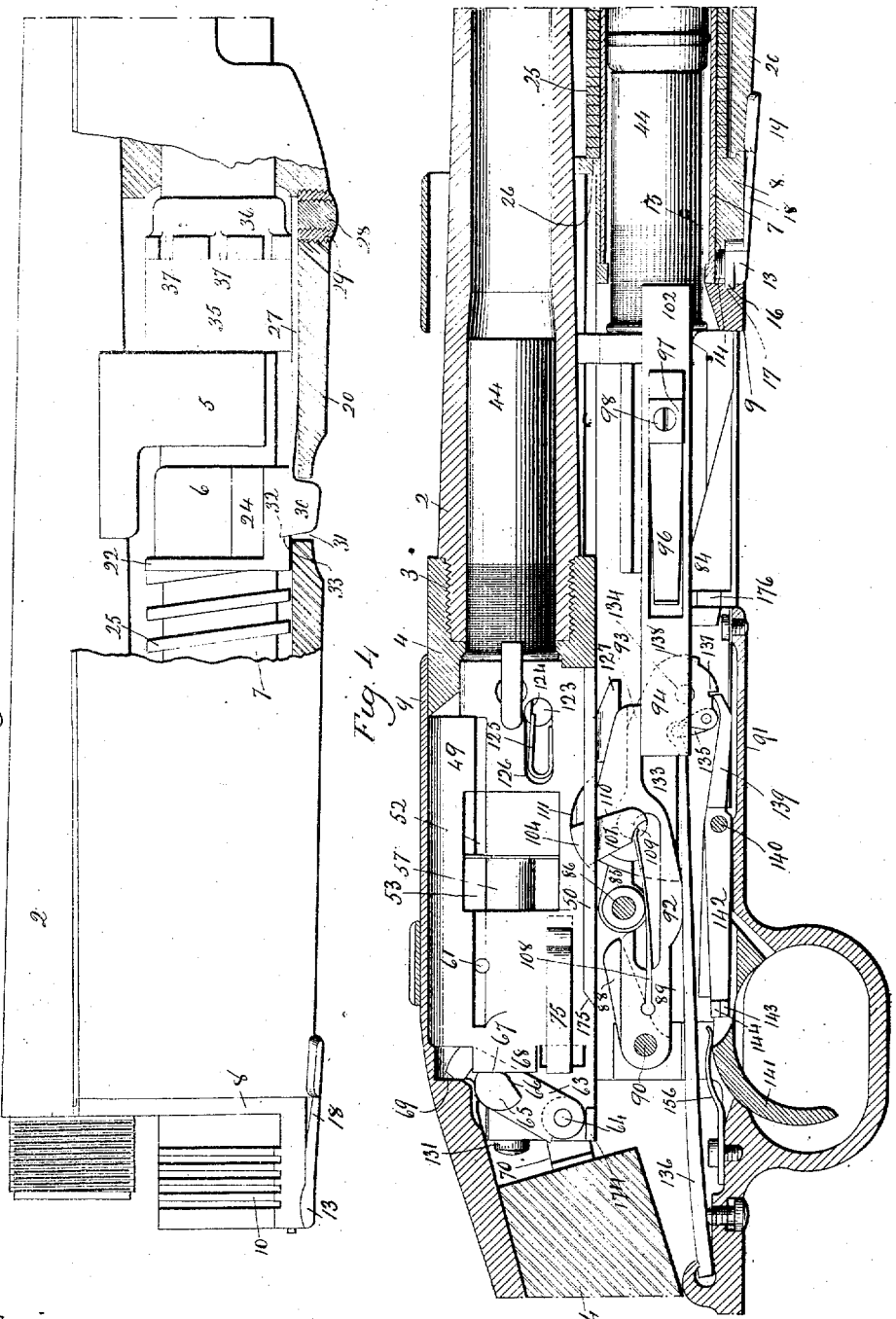

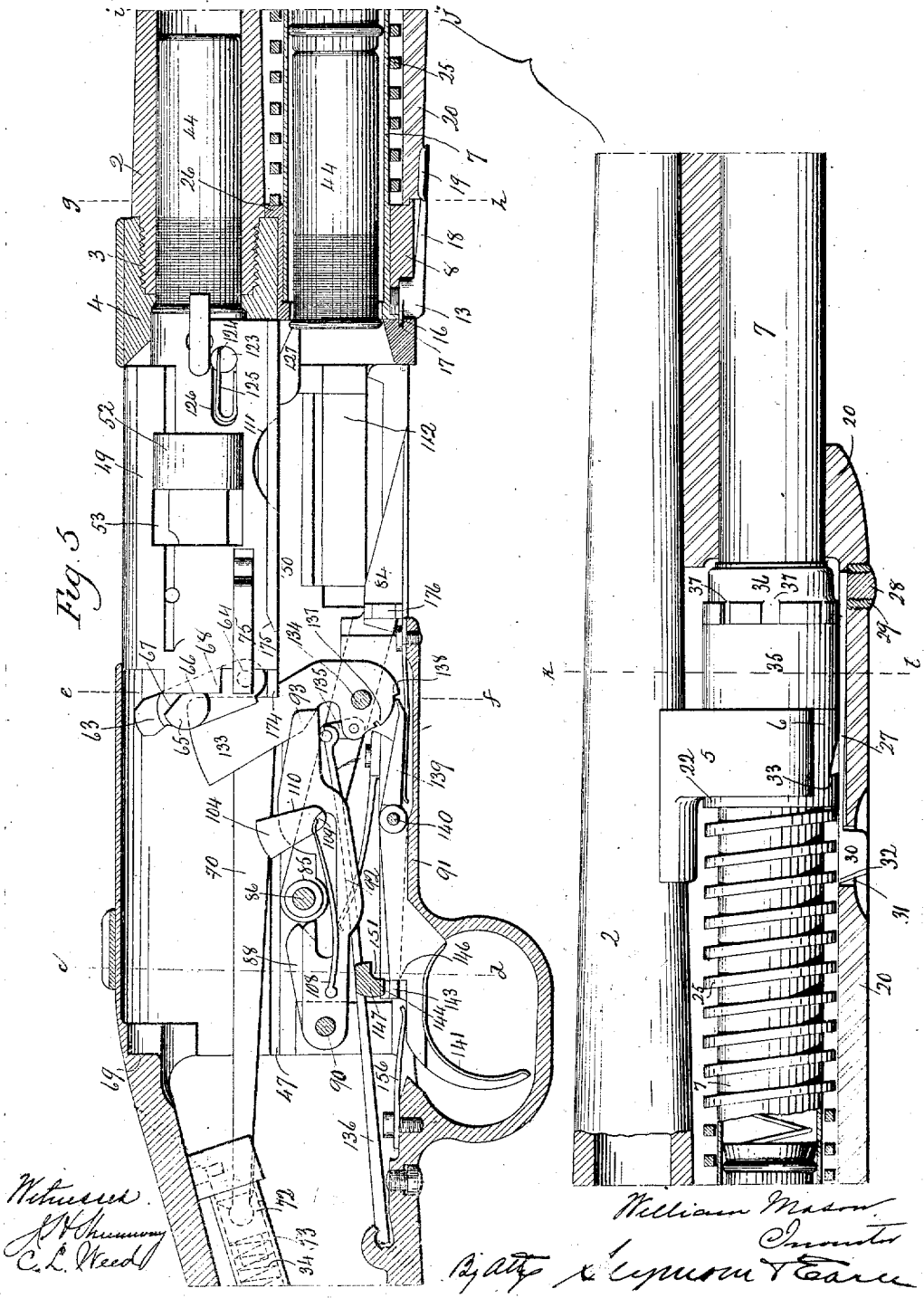

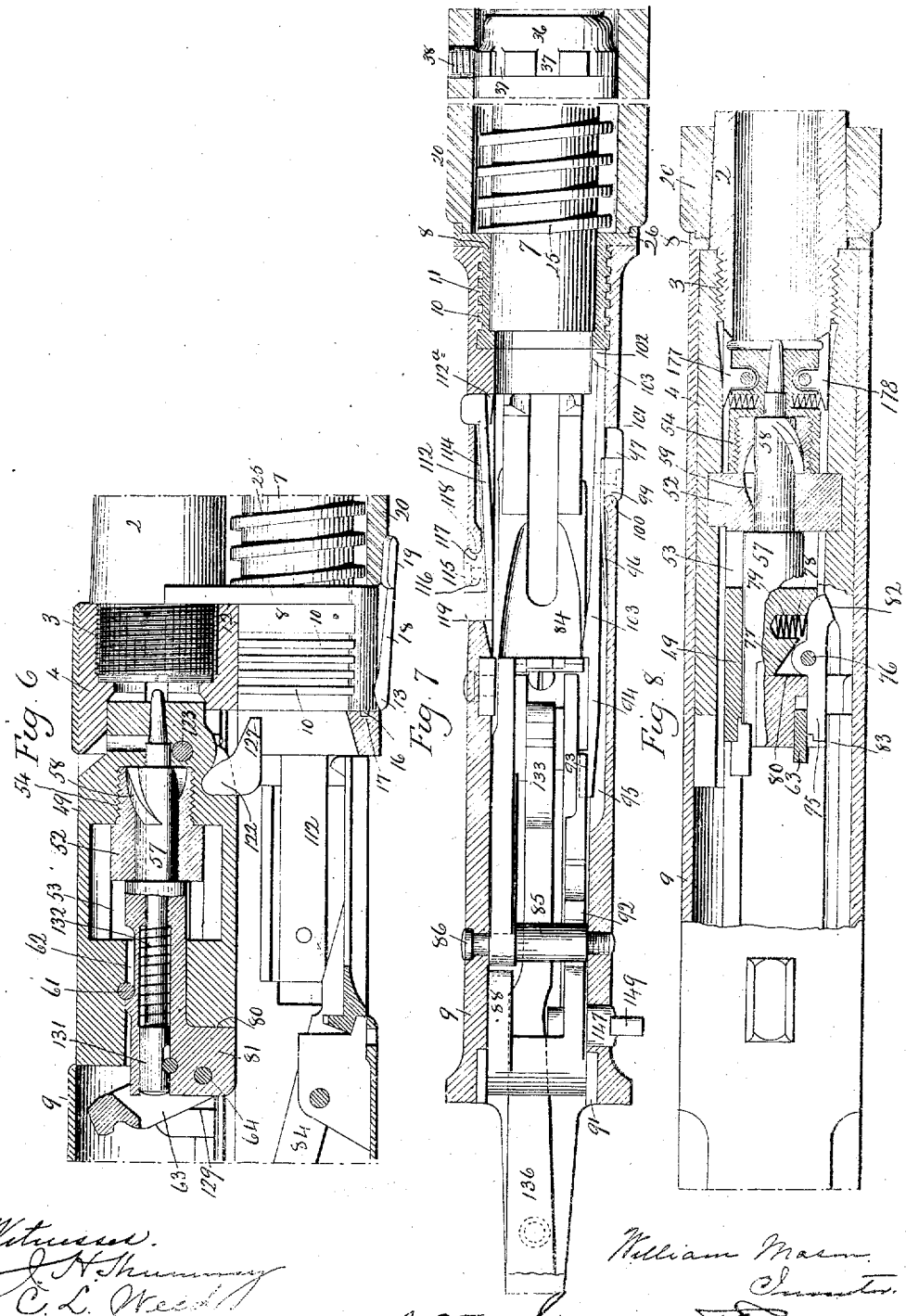

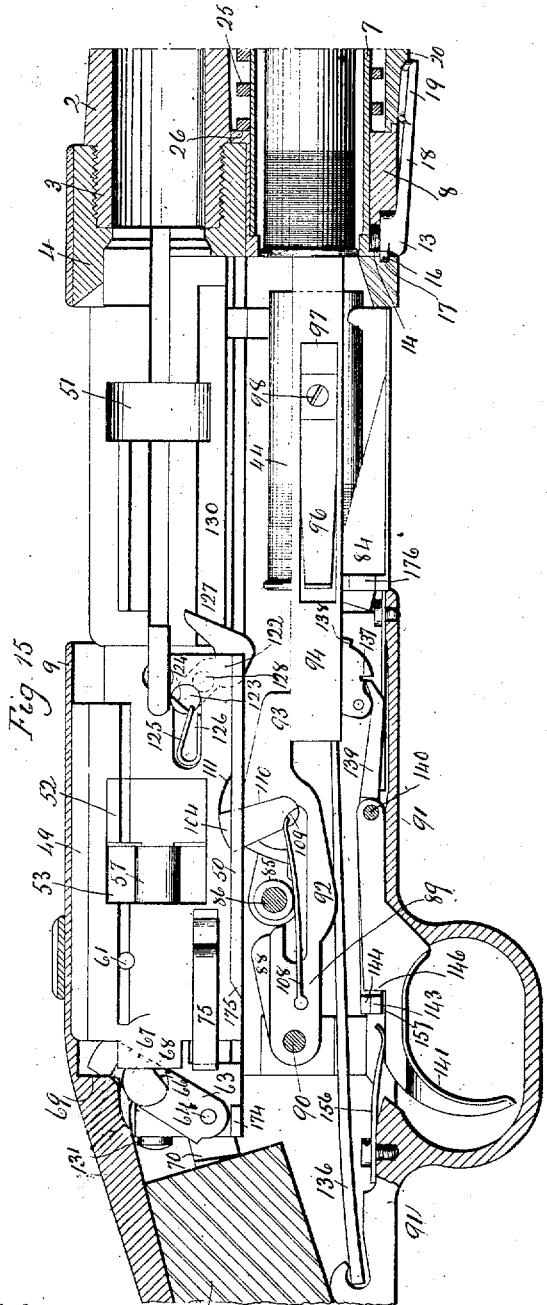

No. 874,856.
PATENTED DEC. 24, 1907.
W. MASON.
TUBULAR MAGAZINE AUTOMATIC GUN.
APPLICATION FILED FEB. 18, 1907.
12 SHEETS—SHEET 7.
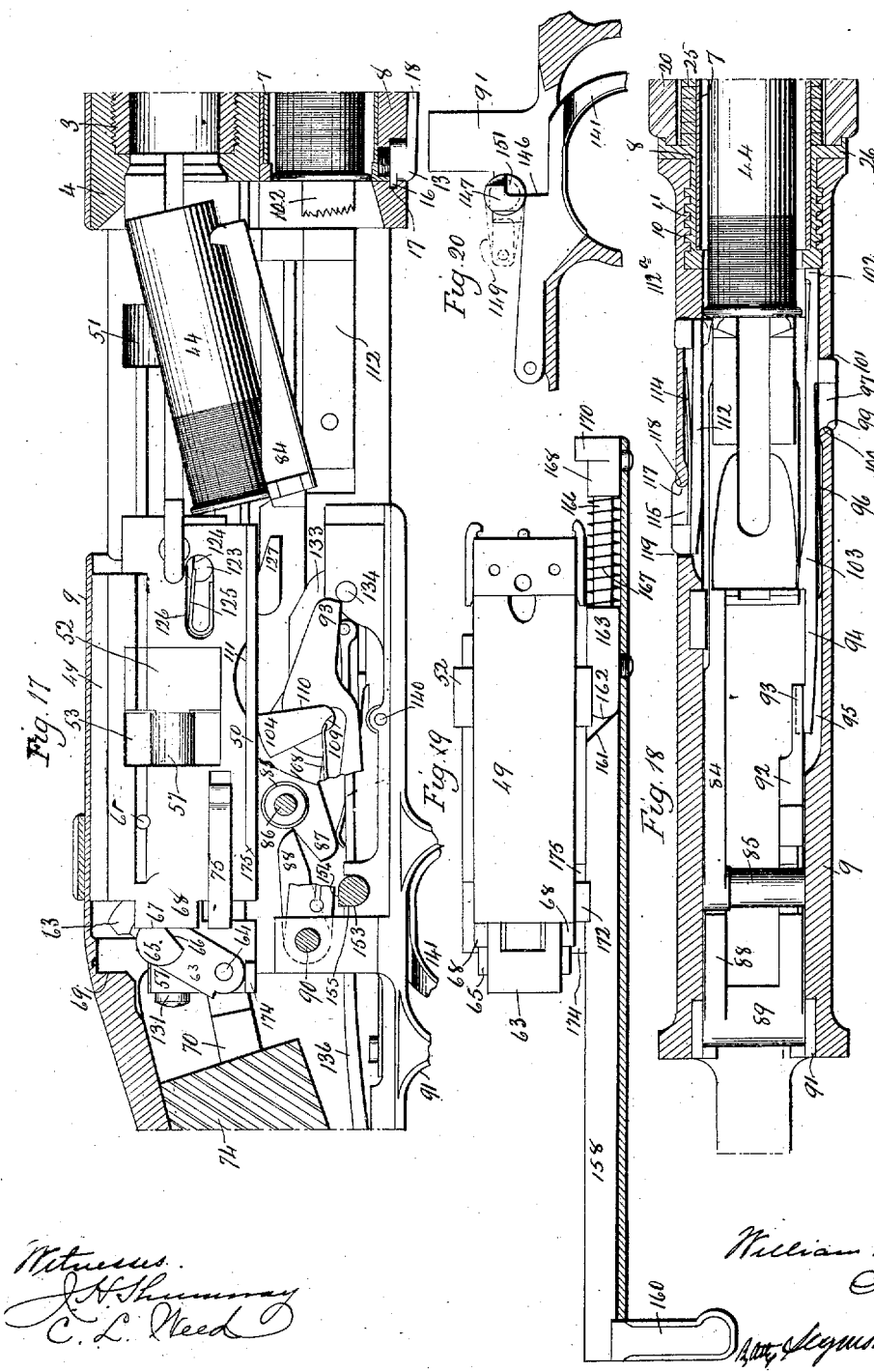

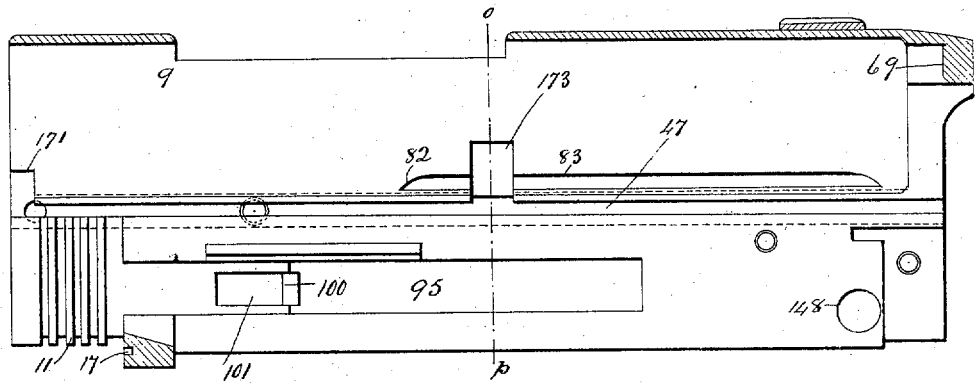
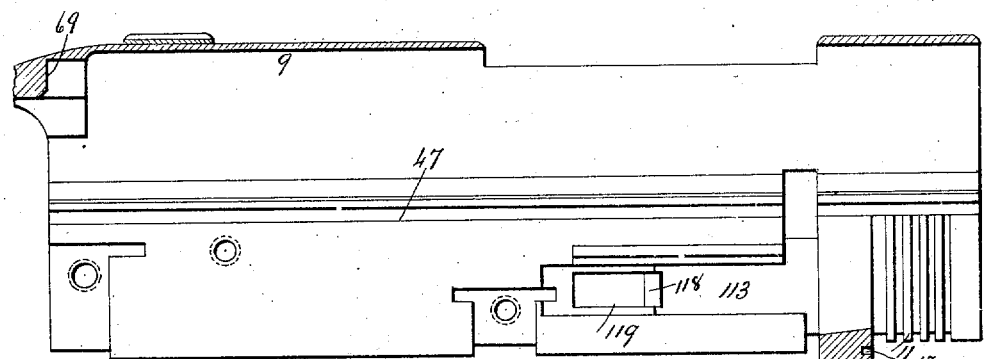
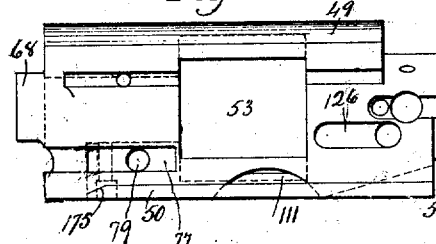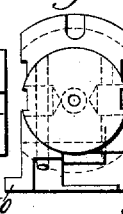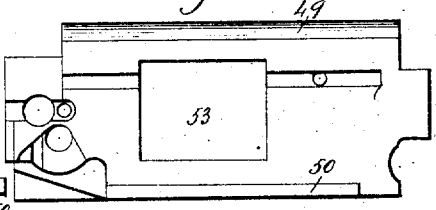
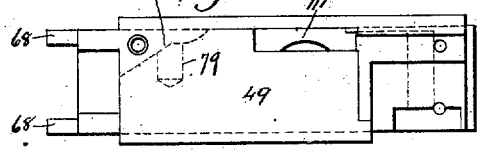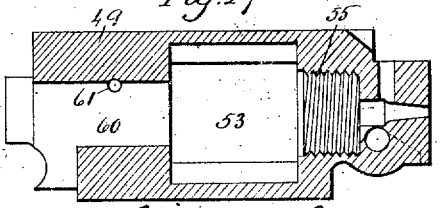

No. 874,856. PATENTED DEC. 24, 1907.
W. MASON.
TUBULAR MAGAZINE AUTOMATIC GUN.
APPLICATION FILED FEB. 18, 1907.
12 SHEETS—SHEET 9.
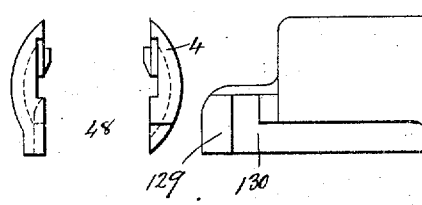
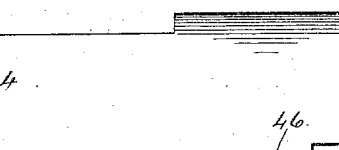
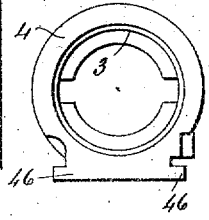
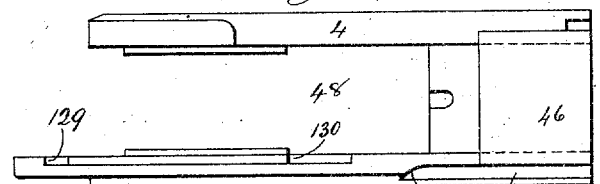
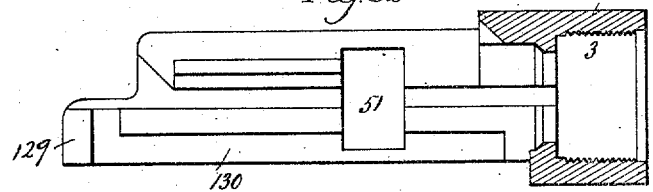
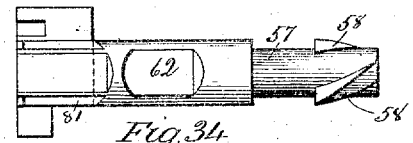
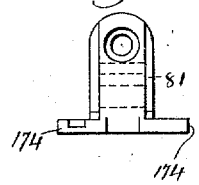
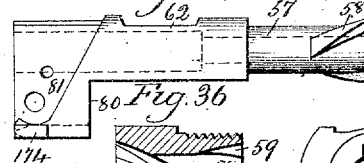
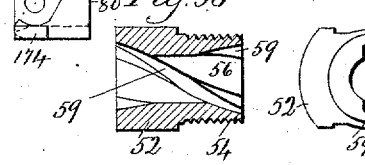
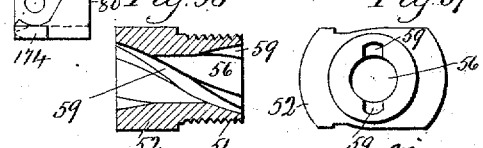

No. 874,856. PATENTED DEC. 24, 1907.
W. MASON.
TUBULAR MAGAZINE AUTOMATIC GUN.
APPLICATION FILED FEB. 18, 1907.

12 SHEETS—SHEET 10.

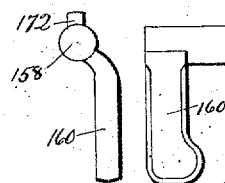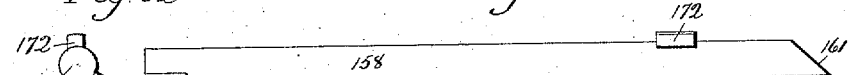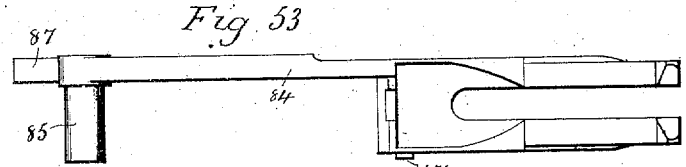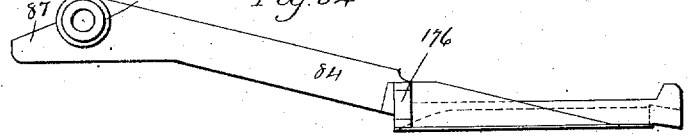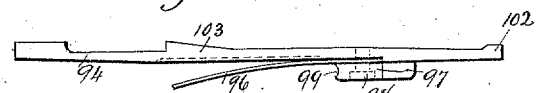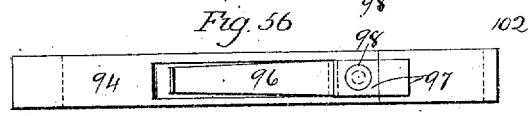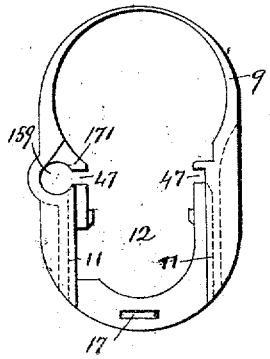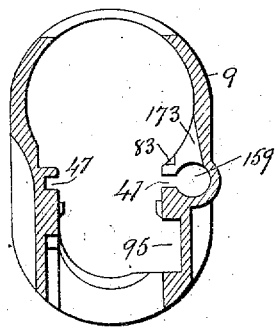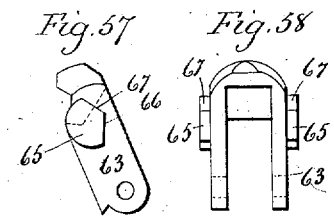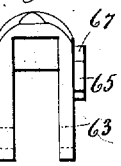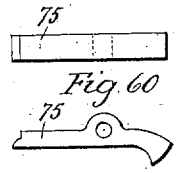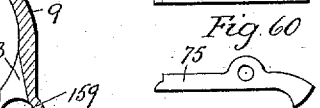

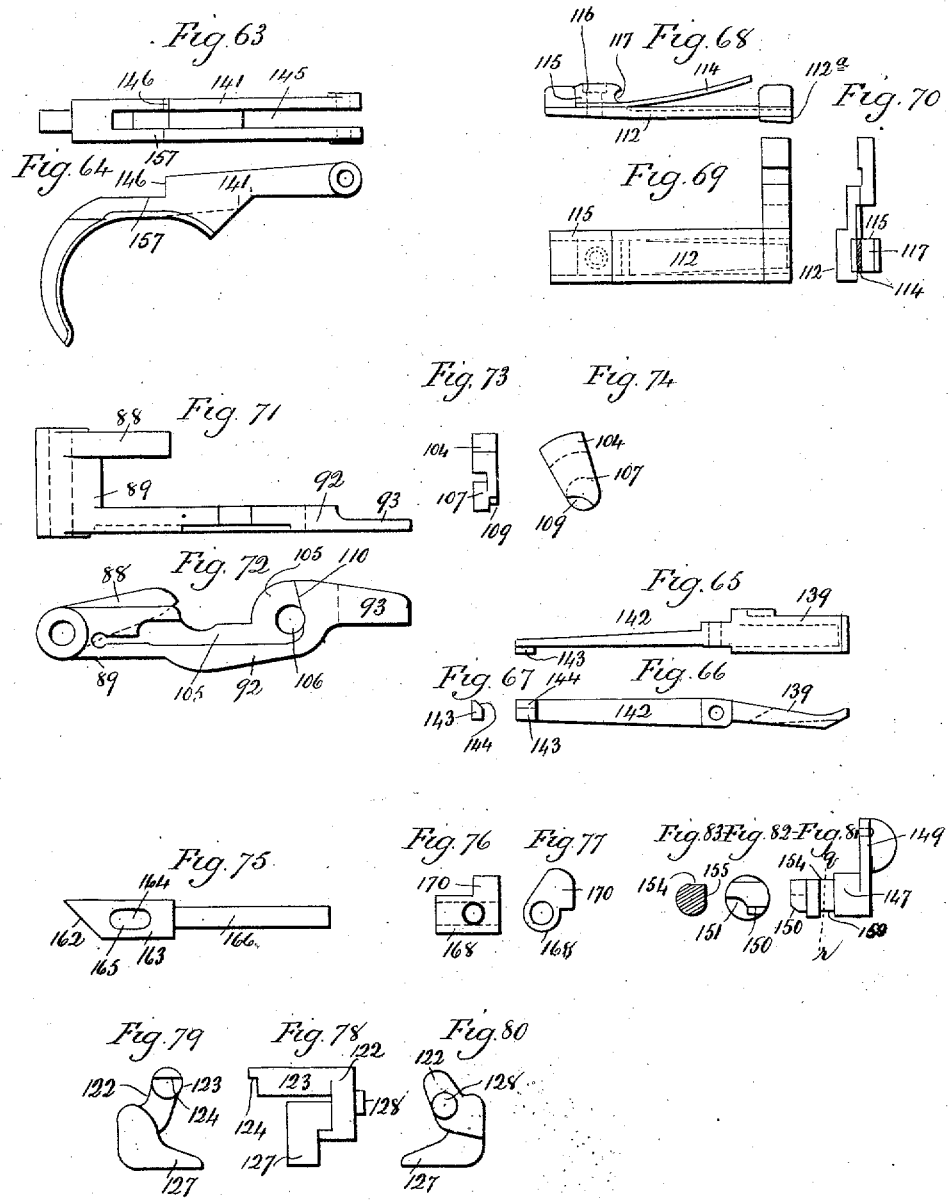

UNITED STATES PATENT OFFICE.

WILLIAM MASON, OF NEW HAVEN, CONNECTICUT, ASSIGNOR TO WINCHESTER REPEATING ARMS CO., OF NEW HAVEN, CONNECTICUT, A CORPORATION.

TUBULAR-MAGAZINE AUTOMATIC GUN.

No. 874,856.　　　Specification of Letters Patent.　　　Patented Dec. 24, 1907.

Application filed February 18, 1907. Serial No. 358,111.

*To all whom it may concern:*

Be it known that I, WILLIAM MASON, a citizen of the United States, residing at New Haven, in the county of New Haven and State of Connecticut, have invented a new and useful Improvement in Tubular-Magazine Automatic Guns; and I do hereby declare the following, when taken in connection with the accompanying drawings and the letters of reference marked thereon, to be a full, clear, and exact description of the same, and which said drawings constitute part of this specification, and represent, in—

Figure 38:
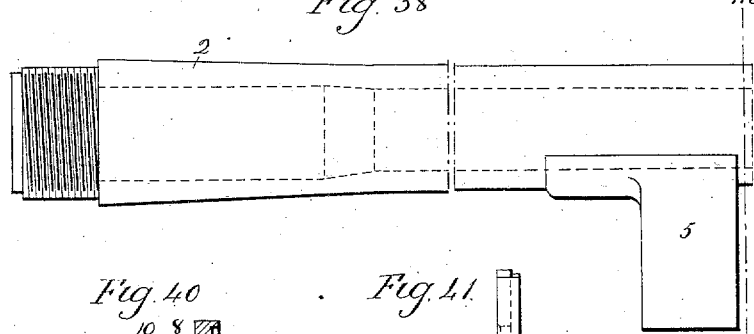
Figure 39:
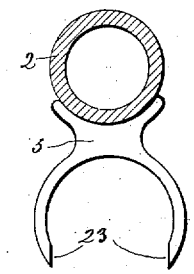
Figure 40:
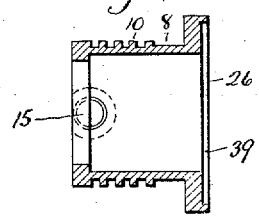
Figure 41:
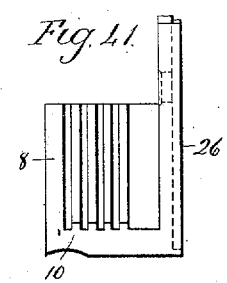
Figure 44:
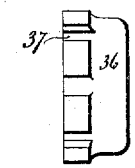
Figure 45:
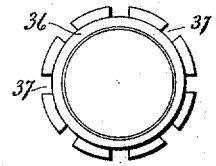
Figure 42:
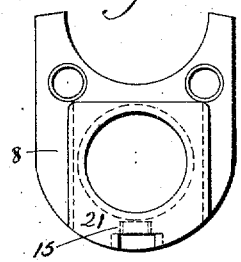
Figure 43:
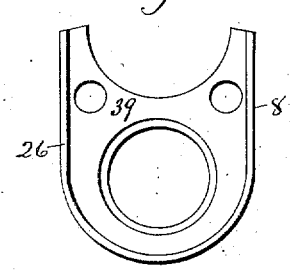
Figure 46:
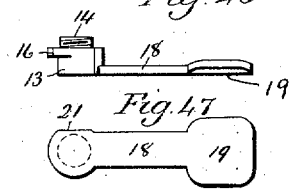
Figure 47:
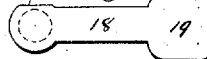
Figure 48:
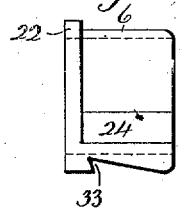
Figure 49:
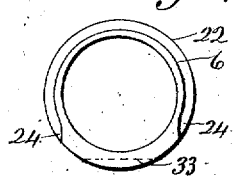
Figure 50:
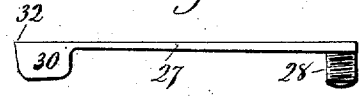

Figure 1 a broken view in side elevation of a gun constructed in accordance with my invention and showing the main portion of the receiver. Fig. 2 a corresponding view with the barrel and forearm removed from the front end of the receiver as when the gun is taken down. Fig. 3 a broken view in right hand side elevation of the barrel and forearm as detached from the receiver, a portion of the forearm being broken away to show the connection between the barrel and the magazine and some related parts. Fig. 4 a broken view in vertical longitudinal section of the gun, showing the barrel, barrel-extension and breech-block at the limit of their recoiled positions. Fig. 5 a corresponding view showing the gun closed with the parts as positioned at the moment of firing, the lower portion of the figure being an extension of the forward end of the upper portion of the figure. Fig. 6 a broken view of the gun in vertical longitudinal section with the parts in position for firing, and showing in particular the construction of the breech-block and locking-slide which are represented in section. Fig. 7 a broken view of the gun in horizontal section on an irregular line passing beneath the breech-block, the parts being in the same position as in Fig. 5. Fig. 8 a broken view in horizontal section through the center of the breech-block with a portion of the block broken away to expose the locking-slide latch. Fig. 9 a broken view of the gun in horizontal section on the line *a—b* of Fig. 11. Fig. 9ª a detached plan view of the trigger-guard, showing in particular the relation of the laterally flexible arm of the sear to the trigger-lock. Fig. 10 a view of the gun in transverse section on the line *c—d* of Fig. 5. Fig. 11 a view of the gun in transverse section on the line *e—f* of Fig. 5. Fig. 12 a view in transverse section on the line *g—h* of Fig. 5, through the magazine and looking rearward, at the front end of the receiver, the barrel being removed. Fig. 13 a view in transverse section on the line *i—j* of Fig. 5 through the barrel, magazine and forearm. Fig. 14 a view in transverse section through the barrel, magazine and forearm on the line *k—l* of Fig. 5. Fig. 15 a broken view of the gun in vertical longitudinal section, the gun being open with a cartridge on the carrier and the breech-block ready to begin its forward movement. Fig. 16 a view in horizontal section on a line just below the breech-block and showing the parts in the same position as in the preceding figure. Fig. 17 a broken view in vertical longitudinal section showing the carrier in its elevated position, and the breech-block moving forward to push the cartridge upon the carrier into the chamber in the gun-barrel. Fig. 18 a broken view in horizontal section with the parts as shown in Fig. 4 and taken immediately below the breech-block. Fig. 19 a detached plan view of the breech-block and the manual operating slide with the latter in position to operate the former. Fig. 20 a detail sectional view showing the locking of the trigger by the trigger-lock. Fig. 21 a detached view of the receiver in vertical longitudinal section, looking from left to right, and shown as stripped of all parts. Fig. 22 a corresponding view of the receiver, looking from right to left. Fig. 23 a detached view in right hand elevation of the breech-block. Fig. 24 a view of the breech-block in front elevation. Fig. 25 a view of the breech-block in left hand side elevation. Fig. 26 a reverse plan view of the breech-block. Fig. 27 a view of the breech-block in central vertical longitudinal section. Fig. 28 a detached view in right hand side elevation of the barrel-extension. Fig. 29 a view thereof in front elevation. Fig. 30 a view thereof in rear elevation. Fig. 31 a reverse plan view thereof. Fig. 32 a view thereof in vertical central longitudinal section looking from right to left. Fig. 33 a detached plan view of the locking-slide. Fig. 34 a view thereof in right hand side elevation. Fig. 35 a view thereof in rear elevation. Fig. 36 a detached view in vertical longitudinal section of the breech-lock. Fig. 37 a view thereof in front elevation. Fig. 38 a detached broken view in right hand side elevation of the barrel. Fig. 39 a view thereof in vertical section on the line m—n of Fig. 38 and showing the guide-fork in front elevation. Fig. 40 a detached view in horizontal section of the magazine take-down head. Fig. 41 a view thereof in right hand side elevation. Fig. 42 a view thereof in rear elevation. Fig. 43 a view thereof in front elevation. Fig. 44 a detached view in side elevation of the buffer abutment nut. Fig. 45 a view thereof in front elevation. Fig. 46 a detached view in side elevation of the swinging magazine lock. Fig. 47 a reverse plan view thereof. Fig. 48 a detached view in side elevation of the barrel guide sleeve. Fig. 49 a view thereof in front elevation. Fig. 50 a detached view in side elevation of the barrel guide sleeve latch. Fig. 51 a detached view in side elevation of the manual operating slide. Fig. 52 a view thereof in rear elevation. Fig. 53 a detached plan view of the pivotal carrier. Fig. 54 a view thereof in right hand side elevation. Fig. 55 a detached plan view of the right hand cartridge-stop. Fig. 56 a view thereof in side elevation. Fig. 57 a detached view in side elevation of the locking-slide lever. Fig. 58 a view in front elevation thereof. Fig. 59 a detached view in side elevation of the locking-slide latch. Fig. 60 a plan view thereof. Fig. 61 a view in front elevation of the receiver. Fig. 62 a view of the receiver in vertical transverse section on the line o—p of Fig. 21. Fig. 63 a detached plan view of the trigger. Fig. 64 a view thereof in side elevation. Fig. 65 a detached plan view of the sear. Fig. 66 a view thereof in right hand side elevation. Fig. 67 a rear end view thereof. Fig. 68 a detached plan view of the left hand cartridge-stop. Fig. 69 a view thereof in side elevation. Fig. 70 a view thereof in front elevation with the spring in section. Fig. 71 a detached plan view of the timing-lever. Fig. 72 a view thereof in right hand side elevation. Fig. 73 a detached view in rear elevation of the timing-lever fly. Fig. 74 a view thereof in side elevation. Fig. 75 a detached view in side elevation of the manual operating slide plunger. Fig. 76 a detached view in side elevation of the barrel-extension stop. Fig. 77 a view thereof in front elevation. Fig. 78 a detached view in front elevation of the ejector. Fig. 79 a view thereof in right hand side elevation. Fig. 80 a view thereof in left hand side elevation. Fig. 81 a detached view in rear elevation of the trigger-lock. Fig. 82 an end view of the trigger-lock trunnion. Fig. 83 a view of the trigger-lock trunnion on the line q—r of Fig. 81.

My invention relates to an improved gas-operated or automatic gun having a recoiling barrel and tubular magazine, the object being to produce a gun of superior convenience and safety, constructed with particular reference to adapting the gun to be taken down and set up without the use of tools at the pleasure of the owner, to insure a positive timing of the forward movement of the breech-block dependent upon the complete feeding of a cartridge from the magazine into position upon the carrier, to effect a closer timing of the objection of the spent shell and to provide improved means for operating the arm manually.

With these and other objects in view, as will hereinafter appear, my invention consists in a gun having certain details of construction and combinations of parts as will be hereinafter described and pointed out in the claims.

In carrying out my invention as herein shown, I employ a barrel 2 (Figs. 38—39) having its butt end threaded for being screwed into a correspondingly threaded socket 3 in the front end of the barrel extension 4 (Figs. 28—32), the threads upon the barrel 2 and in the socket 3 being pitched so as to permit the barrel to be readily screwed and unscrewed by hand. About midway of its length the barrel has a depending guide or take-down fork 5 (Fig. 39) opening downward and receiving and supporting a take-down or bearing sleeve 6 (Figs. 48—49) a trifle larger in internal diameter than the tubular magazine 7, over over which it rides back and forth as the barrel moves back and forth, whereby the barrel is both supported and guided on the recoil and on the recovery by the magazine which is provided at its rear end with a take-down head 8 removably connected with the front end of the receiver 9 (Figs. 21, 22, 61, 62) so as to be readily detached therefrom in taking down the gun and as readily attached thereto in assembling the gun. For this purpose the said take-down head 8 is formed upon its opposite sides with vertical locking ribs 10 which are interlocked with corresponding locking ribs 11 (Figs. 21—22) in the right and left hand side walls of a magazine-opening 12 formed in the lower portion of the front end of the receiver and opening directly downward to permit the magazine take-down head 8 to be introduced into it from below by an upward movement and removed by a reverse downward movement. To secure the head 8 in place in the opening 12, I employ a magazine-lock 13 formed with threads 14 adapting it to be screwed into a threaded opening 15 in the lower face of the head 8 at the rear end thereof, and having a locking lip 16 entering a locking notch 17 (Fig. 61) in the center of the lower end of the front face of the receiver 9 when the spring handle 18 of the lock is in line with the magazine at which time the bowed finger-piece 19, which forms an extension of the handle 18, is in engagement with the lower face of the forearm 20 to which the said finger-piece conforms in curvature, whereby the handle is held in its locked position. To unlock the head 8 from the receiver 9 preparatory to taking down the gun the finger-piece 19 is pushed laterally with sufficient force to spring the handle 18 and so disengage the finger-piece 19 from the forearm after which the lock is swung a quarter turn so as to clear its lip 16 from the locking-notch 17 by the presentation thereto of the flat face 21 of the lock. The head 8 and the magazine and other connected parts will now drop down away from the receiver. To replace them the lock must be turned into its take-down or open position and the head 8 lifted in the opening 12 until the lip 16 is brought into the plane of the locking notch 17 after which the lock is swung back through a quarter turn into its locked position to reach which its finger-piece 19 must be sprung over the curved lower edge of the forearm 20.

The barrel-guide sleeve 6 aforesaid is adapted in external diameter to fit into the barrel-guide fork 5 into which it is introduced laterally at the rear and pushed forward into its home position, being furnished at its rear end with a flange 22 which bears against the rear face of the fork the arms of which are formed at their ends (Fig. 39) with flat faces 23 which coact with corresponding flat faces 24 (Fig. 48) upon the opposite sides of the sleeve and prevent the same from rotating. The opening of the fork is narrower than the diameter of the sleeve, which cannot therefore be lifted into the fork or pulled down out of the fork, but must be inserted into and removed therefrom at the rear end thereof by a horizontal movement as explained.

Normally the sleeve 6 is kept in place in the fork 5 whereby the barrel 2 is connected with the magazine 7, by means of the barrel-closing spring 25 which encircles the rear portion of the magazine, its forward end abutting against the rear face of the flange 22 of the sleeve 6, while its rear end abuts against the forward face of the flange 26 of the take-down head 8. For the purpose of withdrawing the sleeve 6 from the fork 5 preparatory to taking the gun down, I employ a barrel-guide sleeve latch 27 (Fig. 50) furnished at its forward end with a threaded stem 28 drawn into place by means of an internally and externally threaded ferrule 29 mounted in the forward end of the forearm 20. At its rear end the latch 27 has a finger-piece 30 projecting downward through an opening 31 in the forearm and formed at its rear upper corner with a nose 32 adapted to take into a notch 33 in the lower face of the sleeve 6 when the finger-piece is pressed inward by springing the latch. To take the gun down, the barrel 2 is manually pushed back against the tension of the barrel-closing spring 25 until the notch 33 has been brought into registration with the nose 32 of the latch 27 which is then pressed inward to enter the nose into the notch after which the barrel is allowed to go forward under the tension of the breech-block closing spring 34, whereby the fork 5 will be stripped off the sleeve 6 as shown in Fig. 3, leaving the magazine in the fork. Now as the magazine is smaller in diameter than the opening of the fork, the magazine may be drawn down away from the fork and therefore from the barrel, the take-down head having previously been unlocked from the receiver 9 as explained. The magazine and the forearm 20 and the parts connected therewith having been disconnected from the gun, the barrel 2 is unscrewed from the barrel-extension 4 with the aid of the fork 5 which now becomes in effect a handle for use in unscrewing the barrel.

In assembling the gun the barrel 2 is screwed into the barrel-extension 4 after which the magazine take-down head 8 is lifted into position in the receiver 9 and locked therein by the latch 18. The barrel 2 and magazine 7 will now be related as shown in Fig. 3. To recouple them the barrel is manually pushed back against the tension of the spring 34 until the sleeve 6 can be readily disengaged from the nose 32 of the latch 27 which then springs back into its retired position, permitting the barrel-closing spring 25 to push the sleeve 6 forward into the fork 5 in which it will thereafter be retained by the spring 25. It will thus be seen that under my construction a recoiling barrel, tubular magazine automatic gun may, without the use of any tools, be taken down and put together by the owner at his pleasure. As shown the barrel has a continuous thread, but this may be replaced by sectional threads if desired, or any other means of securing the barrel to the barrel extension may be used.

To absorb the shock of stopping the barrel at the limit of its forward movement, I employ an annular buffer 35 of vulcanized fiber or equivalent material, mounted upon the magazine at a point directly in front of the guide fork 5 the forward edge of which impinges against the rear face of the buffer which is held in place by an abutment nut 36 mounted upon the magazine, which is threaded for the purpose, and formed with a series of peripheral notches 37 receiving a threaded locking pin 38 in the left hand side of the forearm, (Fig. 7) whereby the nut is held in any desired position of adjustment with respect to the buffer.

A recess 39 (Fig. 43) in the front face of the flange 26 of the magazine take-down head 8 receives the rear end of the forearm 20. Two forwardly projecting studs 40 (Fig. 9—13) rigidly mounted in the said flange are threaded at their forward ends for the reception of binding nut 41 entering deep recesses 42 in the inner walls of the forearm which is also formed with holes 43 for the reception of the studs 40. In securing the forearm in place it is set back over the studs 40 until its rear end is fully entered into the recesses 39 at which time the threaded forward ends of the studs will project into the recess 42. The nuts 41 are now applied and turned upon the studs until they are brought to a firm bearing upon the rear walls of the said recesses at which time the forearm 20 will be rigidly secured to the take-down head 8.

The magazine 7 is provided with the usual magazine spring, not shown, and follower by which the cartridges 44 are pushed out of its rear end.

The barrel-extension 4 (Figs. 28—32) is housed within the upper portion of the receiver 9 in which it moves back and forth guided by its guide ribs 46 which take into grooves 47 therein (Fig. 62). The said barrel-extension has a large rectangular opening 48 opening upward and downward through it and receiving the breech-block 49 (Figs. 23—27) having guide ribs 50 also entering the grooves 47 aforesaid.

For locking the barrel-extension 4 and breech-block 49 together the barrel-extension is furnished at opposite points in its side walls with vertical locking-recesses 51 which receive the opposite ends of a rotary breech-lock 52 (Figs. 36—37) located in a slot 53 in the breech-block, the forward end of the lock being made in the form of a large threaded trunnion 54 entering a corresponding threaded hole 55 leading out of the forward end of the recess 53. The said lock is also formed with a longitudinal bore 56 for the reception of the forward end of a longitudinally movable locking-slide 57 (Figs. 33—35) having spiral threads 58 taking into spiral grooves 59 in the lock so that when the slide 57 is moved back and forth the lock rotates a quarter turn and engages itself or disengages itself from the locking-recesses 51 in the barrel-extension. For the reception of the slide 57, the breech-block 49 is formed with a longitudinal passage 60 entered by a stop-pin 61 passing through a notch 62 in the top of the slide (Fig. 6), the engagement of the end walls of the said notch with the opposite sides of the pin 61 limiting the movement of the slide with respect to the block. For the retraction of the slide and the unlocking of the breech-block from the barrel-extension, I employ a yoke-shaped locking-slide lever 63 (Figs. 57—58) having the lower ends of its arms connected to the rear end of the slide by a pivot-pin 64 and provided with two cam-like trunnions 65 each having two cam faces 66, 67, respectively coacting with wings 68 (Fig. 26) at the extreme rear end of the breech-block. When the gun is closed the faces 66 of the trunnions 65 bear against the wings 68 as shown in Fig. 5. This position is kept until just before the block reaches the limit of its rearward excursion in recoiling when the upper end of the lever engages with the face 69 within the receiver 9. The continued rearward movement of the block causes the said lever to take the position shown in Fig. 15, the lever rocking, as it were, upon the wings 68 to bring the faces 67 of its trunnions 65 to a bearing upon them. It is this final turning movement of the lever 63 that effects the retraction of the slide with respect to the breech-block, and the consequent turning of the breech-lock 52 into its unlocked position.

The breech-block 49 is moved forward into its closed position by a link 70 having its forward end pivotally secured by the pin 64 to the rear end of the locking-slide 57 and its rear end connected to a plunger 72 in a tube 73 located in the butt-stock 74 and containing the breech-block closing spring 34 which acts through the plunger 72 and the link 70 to push the breech-block forward into its closed position after which the link pushes the slide 57 forward with the effect of rotating the breech-lock 52 and so locking the breech-block to the barrel-extension as before described.

To prevent the spring 34 from pushing the locking-slide 57 forward before the breech-block 49 has been pushed forward into its fully closed position, I employ a locking-slide latch 75 (Figs. 59—60) hung on a pin 76 in a recess 77 in the extreme rear end of the right hand wall of the breech-block. (Figs. 8—9.) A spring 78 located in a pocket 79 in the breech-block engages with the forward end of the said latch and exerts a constant effort to move its notched rear end inward and so in front of the front edge 80 of the depending arm 81 of the slide. The forward thrust of the spring 34 is therefore taken by the latch 75 until just before the block reaches the limit of its forward movement when the outwardly held forward end of the latch engages with a shoulder 82 at the forward end of a long groove 83 formed in the inner face of the right hand wall of the receiver for the clearance of the latch. When the forward end of the latch strikes the said shoulder 82 its rear end is swung out of engagement with the arm 81 of the slide which is then free to be moved forward by the spring 34. The latch 75 is not reëngaged with the slide 57 until after the breech-block reaches the limit of its rearward movement when the slide is retracted as already described by the lever 63 which turns upon its trunnions 65 so as to draw the slide back to the limit of its rearward movement when the rear end of the latch 75 snaps back, so to speak, in front of the front edge of the depending arm 81 of the breech-block.

The cartridges are fed from the magazine 7 upon a cartridge elevator or pivotal carrier 84 (Figs. 53—54) having a heavy trunnion 85 traversed by a screw 86 also passing through the right and left hand walls of the receiver. At its rear end the carrier is furnished with an operating-toe 87 the upper face of which is engaged by the short left hand arm 88 of a timing-lever 89 (Figs. 71—72) hung upon a pin 90 in the trigger-guard 91. This timing-lever is, under my present invention, constructed and arranged so as to positively prevent the carrier 84 from being lifted into its cartridge-delivering position until a cartridge has been fully and properly located upon it, whereby the jamming of the gun by half fed or improperly fed cartridges is wholly avoided. With this end in view the said lever is formed on its right hand side with a long arm 92 the forward end of which constitutes a finger 93 the lower edge of which rests directly upon the upper edge of the rear end of the right hand cartridge stop 94 (Figs. 55—56) which is located in a long shallow recess 95 in the right hand wall of the receiver and furnished with an operating spring 96 which constantly tends to push the extreme rear end of the stop inward under the said finger 93 of the timing-lever. Ordinarily cartridge-stops are hung on vertical pivot pins mounted in the receiver. I dispense with the use of such pins, improving the exterior appearance of the receiver and obviating the necessity of making its side walls heavy enough for their reception. In place of such a pin I employ a plate 97 secured to the outer face of the stop 94 by a screw 98 and having a curved groove 99 formed in its rear edge for the reception of the rounded edge 100 of the rear wall of the opening 101 formed in the right hand side wall of the receiver for the reception of the plate 97 which is just enough shorter than the slot to permit it to swing slightly upon its rear end as upon a center. The extreme forward end 102 of the stop functions as a cartridge-stop in the usual manner. Upon its inner face at a point to the rear of its center, the stop is formed with a cam-like face 103 which is engaged by the heads of the cartridges as they move into final position upon the carrier 84, whereby the rear end of the stop is gradually pressed outward. Just as the cartridge takes its final position upon the carrier the rear end of the stop is moved out from under the lower edge of the finger 93 of the timing-lever 89 which is thus free to be depressed and in turn elevate the carrier through the downward pressure that its short arm 88 exerts upon the toe 87 thereof. The depression of the timing-lever and the elevation of the carrier will never take place, as appears from the foregoing, except when a cartridge has been completely fed upon the carrier for the reason that nothing but the complete rearward movement of a cartridge upon the carrier will effect the disengagement of the finger 93 of the timing-lever from the rear end of the stop.

The timing-lever 89 is positively depressed when freed as above described, by means of a timing-lever fly 104 (Figs. 73—74) in a recess 105 in the outer face of its arm 92 which has a hole 106 for the trunnion 107 of the fly. A spring 108 in the recess 105 enters a notch 109 in the trunnion 107 and exerts a constant effort to swing the fly forward for the engagement of its forward edge with the forward wall of the recess 105 at the point 110, the said wall forming a stop-shoulder, as it were, for the fly which extends upward in position to enter a slot 111 in the lower face of the breech-block which is constantly urged forward by the spring 34. As long, however, as the rear end of the cartridge-stop 94 holds up the long arm 92 of the timing lever 89, the fly 104 will prevent the breech-block from being moved forward. But when the lever is released by the stop as described, the breech block moves forward and through the fly positively crowds down the timing-lever which in turn elevates the carrier which lifts the cartridge in front of the block which pushes it into the barrel. What I particularly wish to call attention to is that through the medium of the timing-lever fly 104 the timing-lever 89 positively prevents the breech-block from starting forward until a cartridge has been fully fed upon the carrier. In other words, the breech-block will never start forward and jam a partly fed cartridge because the block is not released for moving forward except when a cartridge has been fully fed onto the carrier, whereby the jamming of the gun by improperly or partly fed cartridges is wholly prevented. When the breech-block moves back into its open position, the fly 104 yields and permits the block to ride over it without any effect upon the timing-lever.

To delay the feeding of a cartridge from the magazine until after the barrel and barrel-extension have been moved forward as far as they will go by the spring 25, I employ a left hand cartridge stop 112 (Figs. 68—69—70) located in a recess 113 (Fig. 22) in the inner face of the left hand side wall of the receiver and furnished with a spring 114. A plate 115 secured to the stop by a screw 116 has its front edge formed with a groove 117 receiving the correspondingly rounded rear wall 118 of an opening 119 formed in the left hand wall of the receiver for the reception of the said plate and made enough longer than the plate to permit the same to swing upon the curved edge 117 as upon a center. In this respect the stop 112 is like the stop 94. The nose 112$^a$ at the forward end of the stop 112 which stops the cartridges from being fed rearward upon the carrier, is itself engaged by a shoulder 120 at the rear end of a slot 121 in the left hand side of the barrel-extension 4. When the barrel-extension is at the limit of its forward movement the said shoulder 120 retires the nose 112ª and permits a cartridge to be fed out of the magazine on to the carrier. Now when the barrel-extension 4 recoils with the barrel the shoulder 120 moves away from the nose 112ª which immediately springs inward and catches the cartridge after it has been partially fed and holds it during the entire rearward movement of the barrel-extension and during the subsequent forward movement thereof until the barrel-extension has almost reached its forward position when the shoulder 120 again engages with the nose 112ª and pushes the same out of the way and allows the partly fed cartridge to be fully fed upon the cartridge-carrier. I thus delay the feeding of a cartridge upon the carrier until the barrel and barrel-extension have recoiled and returned to their normal positions. The breech-block is left locked at the limit of its rearward excursion as already described, until it is released for pushing the cartridge into the barrel by the action of the cartridge which does not act to unlock the block until it is fully fed out upon the carrier.
In order to prevent a cartridge from being fed out of the magazine when the gun is closed, at which time the right hand cartridge stop and the left hand cartridge stop 112 are retired, I utilize an ejector 122, (Figs. 79—80) having a heavy trunnion 123 and mounted in the forward end of the breech-block, the trunnion being flattened as at 124 for engagement by an ejector spring 125 in a recess 126 in the right hand side of the breech-block. The ejector has a toe 127 which not only ejects the spent shells through the top of the gun but also acts as a cartridge-stop when the gun is closed and the stops 94 and 112 are retired, the said toe extending downward and forward at this time into position to engage with the rearmost cartridge in the magazine. The ejector is formed upon its left hand side with a short stud 128 engaged by a shoulder 129 at the rear end of a slot 130 in the inner face of the left hand side of the barrel-extension 4, just as the same reaches its closed position. This supplies the impetus for swinging the ejector as required for its cartridge-ejecting function. The said ejector 122 is located symmetrically between two pivotal spring-actuated horizontally arranged hook extractors 177—178 also mounted in the front end of the breech-block. These extractors are engaged with the head of the spent shell at the time the pivotal ejector strikes the lower face of the same and serve to prevent the shell from swerving to one side or the other when it is so struck, whereby the shell is guided, as it were, in being thrown directly upward out of the gun.

It will be seen from the foregoing that when the breech-block is at the limit of its rearward excursion the right hand cartridge stop 94 prevents the feeding of a cartridge from the magazine (Fig. 16)—that when the block and the barrel-extension are both at the limit of their rearward excursion, the left hand stop 112 prevents a cartridge being fed from the magazine (Fig. 18) and that when the barrel-extension and block are both in their normal positions or at the limit of their forward movement, the ejector prevents a cartridge from being fed from the magazine. (Fig. 5.)

The locking slide 57 has a passage for a firing pin 131 encircled by a spring 132 and operated by a hammer 133 hung on a pivot 134 in the trigger-guard 91, and connected by a link 135 with the hammer-spring 136. The hammer has a cock-notch 137 and a stop-shoulder 138 which latter prevents the hammer from being thrown forward by the spring 136 when the gun is taken down. Both the notch 137 and the shoulder 138 coact with a sear 139 hung upon the pivot pin 140 of the trigger 141 (Figs. 63—64). The rear end of the sear consists of a laterally flexible arm 142 terminating in a lug 143 extending to the right and having its upper face formed with a bevel 144. The said arm 142 lies in a long opening 145 formed in the trigger and wide enough to permit the required lateral flexure of the arm the lug 143 of which extends just beyond a shoulder 146 formed on the upper face of the trigger. Directly above the said lug 143 I locate a trigger-lock 147 (Figs. 81—82—83) in a hole 148 in the right hand wall of the receiver. This trigger lock has a finger lever 149 and is formed with a cam or bevel 150, and with a trigger-clearance notch 151. The said stop is also formed with a circumferential groove 152 which latter adapts the stop to be set into a U-shaped slot 153 in the trigger-guard, the reduced portion or neck thus formed having two flat faces 154 and 155 which by their engagement with the opposite vertical walls of the slot 153 limit the rotation of the stop by the finger-lever 149 to an arc of 90 degrees. When the trigger 141 is pulled and lifted against the tension of its spring 156, the sear moves with it for the reason that as the lug 143 on the laterally flexible arm 142 of the sear is at this time resting upon the right hand side of the trigger at the point 157, as seen in Fig. 63 the sear must be lifted as the trigger is pulled. Now as the trigger and sear are lifted together, the bevel 144 of the lug 143 engages with the bevel 150 of the trigger-stop, whereby the arm 142 will be gradually sprung laterally from right to left and ultimately disengaged from the trigger but this will not take place until the nose of the sear is disengaged from the cock-notch 137 of the hammer. The trigger being then entirely disengaged from the sear, moves upward independent thereof to the limit of its upward movement. It is apparent, however, that the gun cannot be fired again until the trigger has been released and allowed to move downward and forward so as to permit the arm 142 of the sear to snap back over it again, for otherwise the pulling of the trigger will have no effect on the sear. When the trigger-lock is in its normal position, the shoulder 146 of the trigger rises into the trigger-clearance notch 151. When, however, the trigger lock is turned forward by its finger-lever 149 the slot 151 will be carried out of registration with the shoulder 146 which will collide with the inner end of the lock and thus obstruct the action of the trigger, as shown in Fig. 20.

For the purpose of manually operating the gun, I employ an operating-slide 158 (Figs. 51—52) circular in cross-section and located in a bore-like chamber 159 in the right hand wall of the receiver. This slide also turns on its longitudinal axis through about 90 degrees and is furnished at its rear end with a handle 160 which normally hugs the side of the receiver as shown in Figs. 1 and 2. At its forward end the slide terminates in a bevel 161 for coaction with a bevel 162 at the rear end of a plunger 163 (Fig. 75) in the forward end of the said chamber 159 and formed with a shallow recess 164 receiving a stop pin 165. At its forward end the plunger 163 has a stem 166 encircled by a coiled spring 167 tending to push the plunger rearward and bearing at its forward end in a spring-abutment 168 (Figs. 76—77) held in place by a binding screw 169 and having at its forward end an inwardly projecting stop-finger 170 entering a recess 171 (Figs. 21—61) in the right hand side of the front face of the receiver 9 and projecting sufficiently inward into the path of the barrel-extension 4 to prevent the same from coming out of the receiver when the gun is taken down at which time the said extension would drop out of the receiver if it were not for this finger 170. When it is desired to remove the barrel-extension from the receiver, the binding screw 169 which holds the abutment 168 in the receiver, is unscrewed and withdrawn from the same, whereupon the abutment 168 is pushed forward and out of the receiver by the coiled spring 167 which encircles the stem 166 of the plunger 163 as described. The barrel-extension with the breech block and its attached parts are then free to be withdrawn from the receiver.

Near its forward end the slide is furnished with an inwardly projecting lug 172 which normally lies in a recess 173 in the inner face of the right hand wall of the receiver, this recess being intersected by the right hand groove 47 of the two grooves 47 which receive the guide-ribs 46 (Fig. 29) of the barrel-extension, as well as the guide-ribs 174 of the locking-slide 57. When the slide 158 is turned by lifting its handle 160 through an arc of 90 degrees, the lug 172 swings out of its retirement in the recess 173 into registration with the right hand slot 47. The gun being at this time closed, the said lug will be brought into position in front of the front end of the right hand guide-rib 174 of the locking slide 57 as shown in Fig. 19 which shows the handle 160 in its operating position. The handle 160 is now used to draw the locking-slide directly back, rotating the breech-lock 52 and so unlocking the breech-block from the barrel-extension. Then when the locking-slide reaches the limit of its movement independent of the breech-block, it acts through the pin 61 (Fig. 6) to pick up, as it were, the breech-block which is then drawn back into its open position, leaving the barrel and barrel-extension in their normal positions. As the breech-block moves back the breech-block closing spring 34 is compressed and a cartridge is allowed to move rearward upon the carrier in doing which it operates as already described, the right hand cartridge-stop 94 which in turn releases the timing-lever 89 and permits the same to be depressed by the breech-block through the medium of the timing lever fly 104, whereby the short arm 88 of the timing-lever operates upon the toe 87 of the carrier 84 to lift the same and hence present the cartridge in front of the breech-block which as soon as the handle 160 is released is moved forward by the breech-block closing spring 34. The first cartridge is thus loaded into the barrel. The handle is now turned down into its normal position, turning the slide on its longitudinal axis and reseating the lug 172 in the recess 173 in the receiver. This restoration of the slide to its normal position is assisted by the action of the spring 167 and the bevels 161 and 162.

In case the user of the arm should forget, after the manual insertion of the first cartridge into the gun barrel, to turn the handle 160 back into its retired position, this is done automatically, for which purpose the extreme rear end of the right hand rib 50 of the breech-block is formed with a bevel 175 which will stand in case the handle is left open, directly in front of the lug 172 the forward edge of which is slightly rounded. Now when the gun is fired, at the very beginning of the recoiling movement of the breech-block the bevel 175 will pass under the lug 172 which will ride upward, as it were, on the bevel and rotate the slide 158 far enough to throw its bevel 161 off the center, so to speak, of the bevel 162 and give the spring 167 a chance to complete the rotation of the slide into its normal position.

As has been explained, the firing of a cartridge leaves the breech-block in its open position in which it is held by a train of parts comprising the timing-lever fly 104, the timing-lever 89 and the right hand cartridge-stop 94. Now in case it is desired to let the breech-block come forward into its closed position without the insertion of any cartridges into the gun, this may be done by unlocking the breech-block through the medium of the carrier 84 which for this purpose is furnished with an unlocking shoulder 176 having its upper edge beveled for coaction with the beveled lower edge of the bevel 103 of the right hand cartridge stop 94 as shown in Fig. 11. Therefore by manually lifting the carrier, its lug 176 will operate to crowd the stop 94 from left to right and so release the timing-lever and permit the same to be pushed downward for the forward movement over it of the breech-block by the spring 34.

In as much as the description of the operation of the gun has been so interdispersed with the detailed description of its mechanism, it is thought that no separate description of the operation of the gun is necessary. It is apparent that in using my invention, all of the several features are not necessarily embodied in any one gun.

I claim:—

1. In an automatic gun, the combination with the receiver thereof, of a barrel and barrel-extension, a tubular magazine adapted to be detachably connected with the forward end of the receiver, a guide-fork carried by the barrel, and a bearing-sleeve mounted in the fork and embracing the magazine and adapted when disconnected from the fork to permit the magazine to be laterally separated therefrom.

2. In an automatic gun, the combination with the receiver thereof, of a recoiling barrel and barrel-extension, a tubular magazine, a take-down head located at the rear end thereof and adapted to be removably connected with the receiver, a downwardly opening guide-fork depending from the barrel and embracing the magazine, a bearing-sleeve located in the said fork to form a bearing for the magazine which it holds in the fork.

3. In a take-down gun, the combination with the receiver thereof, of a barrel and barrel-extension, a tubular magazine having its rear end detachably connected with the receiver, a downwardly opening take-down guide-fork depending from the barrel, having its opening larger than the diameter of the magazine, a bearing-sleeve larger in diameter than the said opening mounted in the fork into which it is inserted from rear to front, a barrel-closing spring encircling the magazine, and means for retracting the sleeve from the fork against the tension of the spring, whereby the magazine may be laterally disconnected from the barrel and receiver.

4. In an automatic gun, the combination with the receiver thereof, of a recoiling barrel and barrel-extension, a tubular magazine adapted to be detachably connected with the receiver, a guide-yoke depending from the barrel, a bearing sleeve for the magazine mounted in the said yoke from which it is laterally movable, a barrel-closing spring encircling the magazine and holding the sleeve in place in the yoke, a forearm, and a latch mounted in the forearm and adapted to be engaged with the sleeve when the spring is compressed for removing the sleeve from the yoke preparatory to laterally separating the magazine and barrel.

5. In an automatic gun, the combination with the receiver thereof, of a recoiling barrel-extension mounted therein, a barrel detachably connected with the barrel-extension, a tubular magazine, connection between the barrel and magazine whereby they may be separated at pleasure, a take-down head mounted upon the rear end of the magazine and adapted to be removably connected with the receiver, and a magazine lock mounted in the said head for engagement with the receiver.

6. In an automatic gun, the combination with the receiver thereof, of a recoiling barrel-extension mounted therein, a barrel removably connected with the barrel-extension, a tubular magazine, means connecting the barrel and magazine, whereby the barrel is supported upon and guided by the magazine, a take-down head located at the rear end of the magazine, removably connected with the receiver and provided at its forward end with a flange, a forearm having its rear end applied to the said flange, and binding studs mounted in the said flange and entering the rear end of the forearm for binding the same to the said flange.

7. In a take-down gun, the combination with the receiver thereof, of a recoiling barrel-extension, a barrel detachably mounted therein, a tubular magazine, means connecting the barrel and magazine, whereby the barrel is supported by and guided upon the magazine, a take-down head located at the rear end of the magazine and provided with vertical locking ribs for co-action with corresponding ribs formed in the side walls of an opening formed in the forward end of the receiver for the reception of the said head, and a magazine-lock for holding the head in the said opening.

8. In an automatic gun, the combination with the receiver thereof, of a recoiling barrel and barrel-extension, a breech-block, a locking-slide therefor, a rotary breech-lock operated by the said slide, and an operating-slide lever pivotally mounted in the rear end of the slide and co-acting with the receiver when the block reaches the limit of its rearward excursion for retracting the slide which thus operates the lock to unlock the barrel-extension from the breech-block.

9. In an automatic gun, the combination with the receiver thereof, of a barrel, a barrel-extension, a breech-block, a locking-slide mounted therein, a rotary breech-lock operated by the said slide to lock the breech-block to the barrel-extension, a yoke-shaped lever pivoted at its lower end to the rear end of the locking-slide and provided with flattened trunnions which engage with the rear end of the breech-block and adapted at its upper end to engage the receiver when the block recoils, so as to retract the slide and operate the lock to release the barrel-extension from the breech-block.

10. In a gun, the combination with a receiver having one of its side walls formed with an opening, of a cartridge-stop located in a recess in the inner face of the said side wall and provided with a plate entering the said opening and having its forward edge formed with a groove receiving and turning upon the rounded front wall of the said opening as upon a center.

11. In a gun, the combination with the receiver thereof, of a longitudinally movable breech-block, a pivotal carrier, a cartridge-stop, and a timing-lever supported in its elevated position by the cartridge-stop and adapted when in that position to hold the breech-block in its open position, the stop being operated to release the lever by the feeding of a cartridge fully upon the said carrier.

12. In a gun, the combination with the receiver thereof, of a longitudinally movable breech-block, a pivotal carrier, a timing-lever coacting with the carrier for lifting the same into its cartridge-delivering position, a cartridge-stop supporting the timing-lever in its elevated position and operated to release the same by a cartridge when the same is fully fed upon the carrier, and a fly mounted in the timing-lever in position to be engaged by the breech-block which it holds in its open position until the timing-lever is released by the cartridge-stop.

13. In a gun, the combination with the receiver, of a breech-block longitudinally movable therein, a pivotal carrier, a timing-lever, coacting with the carrier for lifting the same into its cartridge-delivering position, a laterally movable cartridge-stop supporting the timing-lever in its elevated position and operated to release the timing-lever by the feeding upon it of a cartridge, and a pivotal fly mounted in the timing-lever and engaged by the breech-block for holding the same in its open position as long as the lever is supported in its elevated position by the stop.

14. In a gun, the combination with the receiver thereof, of a longitudinally movable breech-block, a pivotal carrier, a timing-lever, a fly mounted therein and coacting with the breech-block to hold the same in its open position when the timing-lever is held in its elevated position, and a cartridge-stop the rear end of which extends under the forward end of the timing-lever for normally supporting the same in its elevated position, and the said stop being laterally movable to release the timing-lever by the movement of a cartridge into its fully fed position.

15. In an automatic firearm, the combination with the receiver thereof, of a recoiling barrel and barrel-extension, a breech-block formed in one of its sides at its forward end with a recess, a pivotal ejector having a heavy integral trunnion passing transversely through the forward end of the breech-block, a spring located in the said recess and coacting with the free end of the said trunnion, and two spring-actuated horizontally arranged hook-extractors pivotally mounted in the forward end of the breech block on opposite sides of the said pivotal ejector.

16. In an automatic gun, the combination with the receiver thereof, of a recoiling barrel and barrel-extension a tubular magazine, a longitudinally movable breech-block, and an ejector pivotally mounted in the front end of the breech-block and operated by the barrel-extension for the ejection of the spent shells out of the top of the gun and also operating as a cartridge-stop for preventing the cartridge from being prematurely fed out of the magazine when the gun is closed.

17. In an automatic gun, the combination with the receiver thereof, of a recoiling barrel and barrel-extension a longitudinally movable breech-block, a right and a left hand cartridge-stop each operated to obstruct the mouth of the magazine, the former when the breech-block is open and the latter when the breech-block and barrel-extension are recoiling together, and an ejector pivoted in the front end of the breech-block and operated for its cartridge-ejecting function by the barrel-extension and also acting as a cartridge-stop when the gun is closed or substantially closed.

18. In a gun, the combination with the hammer and trigger thereof, of a sear having a flexible finger terminating at its rear end in a safety lug, of a trigger-lock coacting with the lug to flex the said finger laterally to permit the upward movement of the trigger above it, the said trigger-lock being notched for the clearance of the trigger except when the trigger-lock is in its trigger-locking position.

19. In an automatic gun, the combination with the receiver thereof, of a recoiling barrel and barrel extension, a breech-block, a locking-slide therefor, a rotary breech-lock operated by the said slide, and a manually operating slide mounted in the receiver for longitudinal and rotary movement and provided with a lug adapted when the slide is in its operating position to engage with the locking-slide for the manual retraction thereof and the unlocking of the breech from the barrel extension.

20. In an automatic gun, the combination with the receiver thereof, of a recoiling barrel and barrel extension, a breech-block, a locking-slide, a breech-lock operated by the slide, and a longitudinally movable and rotatable operating slide mounted in the receiver and provided with an inwardly extending lug coacting with the slide for retracting the same and adapted to be operated by the breech block at the beginning of the rearward movement thereof for restoring the slide to its retired position in case this is not done manually before the gun is fired.

21. In a take-down gun, the combination with the receiver thereof, of a recoiling barrel extension, a barrel detachably mounted therein, a breech-block, a tubular magazine detachably connected at its rear end with the front end of the receiver, means for connecting the magazine and barrel which is supported and guided in its recoiling movement by the magazine, and means for retaining the barrel extension in the receiver when the barrel has been removed therefrom.

22. In an automatic gun, the combination with the receiver thereof, of a recoiling barrel-extension, a barrel detachably connected therewith, a breech-block, a locking-slide mounted therein, a breech-lock operated by the said slide, a manual operating slide mounted in the receiver and adapted to be engaged by the said slide for manually operating the same, a plunger coacting with the said manual slide, and a spring abutment mounted in the receiver and forming a guide for the said plunger and an abutment for the spring thereof and acting as a stop for the retention in the receiver of the barrel-extension after the removal of the barrel thereof in taking down the gun.

23. In an automatic gun, the combination with a moving part of the gun mechanism, of a longitudinally movable and rotatable manual operating-slide having its forward end beveled, and a spring-actuated plunger having its rear end beveled for holding the slide in its retired position and for restoring it thereto after its rotary movement has been initiated by the said moving part of the gun mechanism.

In testimony whereof, I have signed this specification in the presence of two subscribing witnesses.

WILLIAM MASON.

Witnesses:
DANIEL H. VEADER,
HERBERT F. BEEBE.